United States Patent [19]

Pepper et al.

[11] Patent Number: 5,909,279
[45] Date of Patent: Jun. 1, 1999

[54] ULTRASONIC SENSOR USING SHORT COHERENCE LENGTH OPTICAL SOURCE, AND OPERATING METHOD

[75] Inventors: David M. Pepper, Malibu; Gilmore J. Dunning, Newbury Park; Thomas R. O'Meara, Malibu, all of Calif.

[73] Assignee: Hughes Electronics Corporation, El Segundo, Calif.

[21] Appl. No.: 08/820,665

[22] Filed: Mar. 17, 1997

[51] Int. Cl.⁶ .................................................... G01B 9/02
[52] U.S. Cl. ........................................ 356/345; 356/357
[58] Field of Search ................................. 356/345, 357, 356/358, 432, 35.5; 250/227.19, 227.27

[56] References Cited

U.S. PATENT DOCUMENTS

| | | |
|---|---|---|
| 4,966,459 | 10/1990 | Monchalin . |
| 5,080,491 | 1/1992 | Monchalin et al. . |
| 5,131,748 | 7/1992 | Monchalin et al. . |
| 5,642,192 | 6/1997 | Erskine .................................... 356/345 |
| 5,684,592 | 11/1997 | Mitchell et al. ......................... 356/357 |

OTHER PUBLICATIONS

C.B. Scruby and L.E. Drain, *Laser Ultrasonics, Techniques and Applications*, Adam Hilger, New York, 1990, pp. 325–350.

Petrov et al., "Non–steady–state photo–electromotive–force induced by dynamic gratings in partially compensated photoconductors", *Journal of Applied Physics*, vol. 68, No. 5, Sep. 1, 1990, pp. 2216–2225.

Stepanov, et al., Measuring vibration amplitudes in the picometer range using moving light gratings in photoconductive GaAs:Cr, *Optics Letters*, vol. 15, No. 21, Nov. 1, 1990, pp. 1239–1241.

David J. Erskine and Nell C. Holmes, "White–light velocimetry", *Nature*, vol. 377, Sep. 28, 1995, pp. 317–320.

Brooks et al., Coherence Multiplexing of Fiber–Optic Interferometric Sensors, *Journal of Lightwave Technology*, vol. LT-3, No. 5, Oct. 1985, pp. 1062–1072.

R.K. Ing and J.P. Monchalin, Broadband optical detection of ultrasound by two–wave mixing in a photorefractive crystal:, *Applied Physics Letter*, vol. 59, No. 25, Dec. 16, 1991, pp. 3233–3235.

S. I. Stepanov, "Sensitivity of non–steady–state photoelectromotive force–based adaptive photo–detectors and characterization techniques", *Applied Optics*, vol. 33, No. 6, Feb. 20, 1994, pp. 915–920.

N.A. Korneev and S.I. Stepanov, Measurement of small lateral vibrations of speckle patterns using a non–steady–state photo–EMF in GaAs:Cr, *Journal of Modern Optics*, vol. 38, No. 11, 1991, pp. 2153–2158.

*Primary Examiner*—Samuel A. Turner
*Attorney, Agent, or Firm*—V. D. Duraiswamy; M. W. Sales

[57] ABSTRACT

A dual time delay interferometer (TDI) enables remote sensing of phase modulated information, such as the detection of ultrasonic vibrations from highly diffuse surfaces, preferably in the range from about 10 kHz to 100 MHZ or more. The system can also be configured in a transceive mode with a dual pass through a single TDI, which is well suited to optical communications. A non-steady-state photoelectromotive-force detector tracks the movement of interference fringes (whose position shifts as the surface vibrates), rather than their absolute position. A phased array of the sensors can be used for enhanced imaging applications requiring better signal/noise ratios, or alternatively, when lower power optical sources are employed.

11 Claims, 5 Drawing Sheets

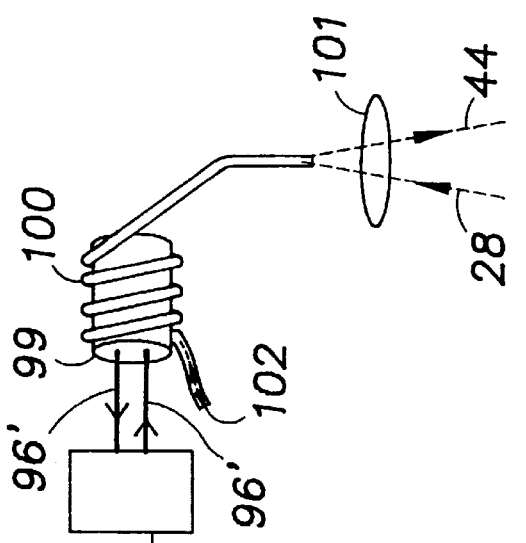
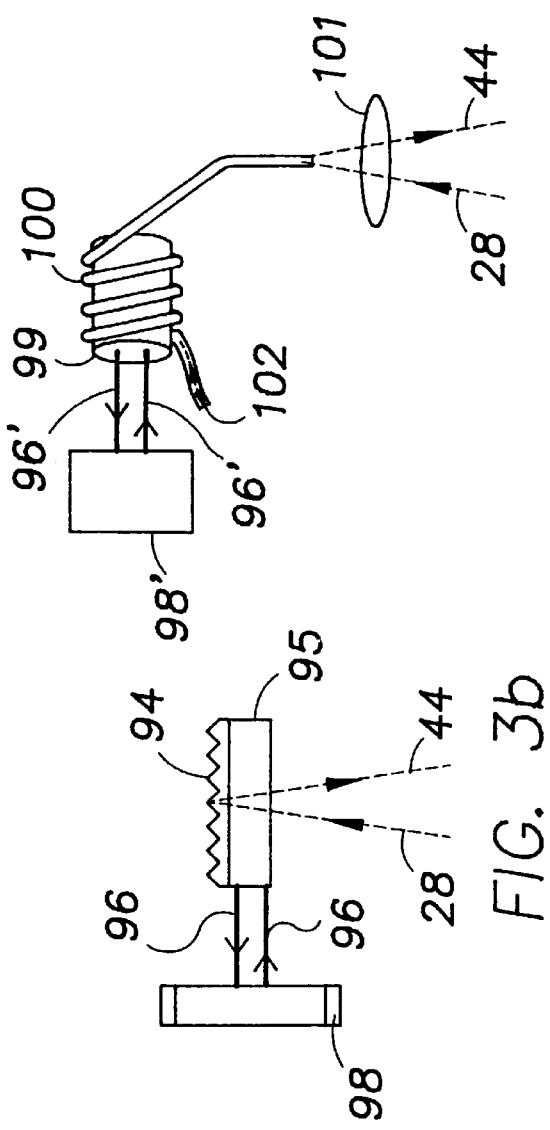
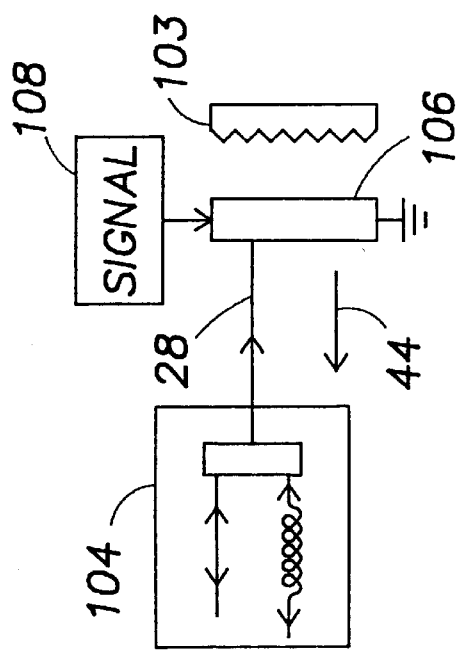
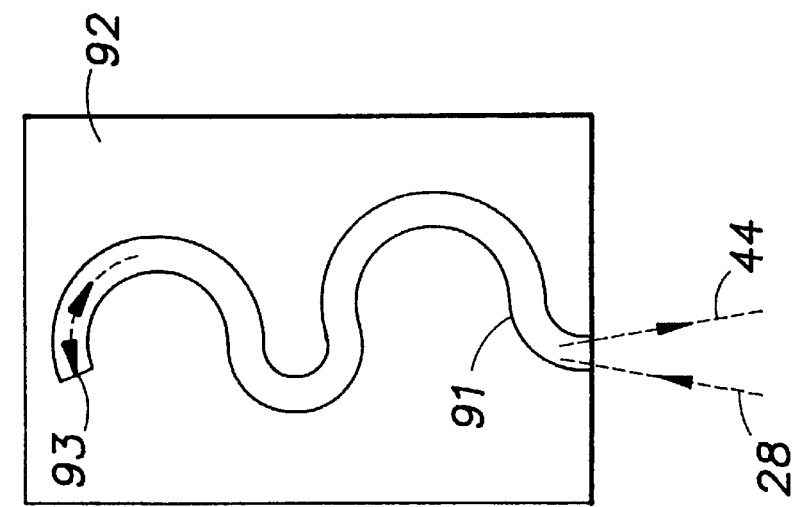

ULTRASONIC SENSOR USING SHORT COHERENCE LENGTH OPTICAL SOURCE, AND OPERATING METHOD

BACKGROUND OF THE INVENTION

1. Field of the Invention

This invention relates to optically-based ultrasonic sensors, including optical communicators and displacement/velocity remote sensing methods, which are based on time delay interferometry.

2. Description of the Related Art

Ultrasonic acoustic waves are commonly used to probe a variety of materials, especially for thickness gauging and flaw detection. The conventional approach is to generate the waves with a contact piezoelectric transducer. The launched waves propagate through the material, reflecting from interfaces between layers of different materials in thickness gauging applications, or from internal features in flaw detection applications. The scattered waves propagate back to the surface of the material, causing its surface to vibrate at the ultrasound frequency. The surface vibration is generally detected with a contact piezoelectric transducer similar to the one used to generate the ultrasonic waves.

Optical detection techniques, such as those described by C. B. Scruby and L. E. Drain in *Laser Ultrasonics, Techniques and Applications*, Adam Hilger, New York (1990), pages 325–350, can be used instead of piezoelectric transducers to detect a surface's displacement. Generally, a laser beam illuminates the surface so that when it vibrates, a phase shift is imparted to the reflected beam. The reflected beam is interfered with a reference beam that originates from the same laser source as the reflected beam. The amplitude and frequency of the intensity fluctuations of the interfering beams correspond to the surface's motion and can be detected with a photodetector.

A "velocity-sensing", or time-delay, interferometer produces an output that is proportional to the velocity (or differential displacement), rather than the displacement, of the moving surface. Time-delay interferometric configurations (described in the Scruby et al. reference, pp. 123–127) provide one technique for doing this. In time-delay interferometry, a probe beam is reflected from the target surface, and the reflected beam is then split into two beams. One of the two beams is time delayed with respect to the other, i.e. it traverses a longer distance. The two beams are recombined along a common axis and propagate collinearly towards a photodetector where they constructively or destructively interfere: the light intensity at the photodetector is proportional to the velocity (or differential displacement) of the target surface. If the surface being probed is diffusely reflecting or scattering, a "speckle" field distribution will be formed on the photodetector. Since the reflected beam is interfered with a time-delayed replica of itself, the wavefronts of the two interfering beams are substantially matched. Consequently, a phase shift in one arm of the interferometer is common to all speckles, and all speckles can be detected optimally. Unlike a conventional interferometer, which has a flat frequency response with respect to phase shifts, a time delay interferometer has a bandpass-type of response in which low frequency vibrations (below ultrasonic frequencies) are suppressed.

There are two problems with this time-delay, or velocity, sensing system, however. First, the speckles are generally so numerous and small that the time delayed arm of the interferometer cannot be easily aligned with the other arm. Unfortunately, introducing a time delay is most easily accomplished with a multimode fiber which further increases the number of speckles and scrambles their locations, making speckle registration very difficult. The second problem is that the time delay must be held constant and stabilized in quadrature, which is a requirement for homodyne detection. If the path length difference that causes the time delay between the beams is not maintained to within a fraction of a wavelength, the sensitivity and temporal resolution of the system will be greatly reduced. As a result, both time-delay and conventional interferometers must typically employ active stabilization techniques. In industrial environments, however, the effectiveness of these techniques is reduced by noise-induced vibrations.

A velocity, or differential, sensing interferometer system which circumvents some of these problems is described in a copending application to P. V. Mitchell, D. M. Pepper, T. R. O'Meara, M. B. Klein, S. W. McCahon and G. J. Dunning, "A System and Method for Detecting Ultrasound Using Time-Delay Interferometry" (Ser. No. 08/481,673, filed Jun. 7, 1995). This system includes a time delay interferometer (TDI), a fringe processing unit (FPU) and a processor that extracts information from the output signal of the FPU. The FPU is preferably a non-steady-state photo-electromotive-force (NSS-photo-EMF) detector made from a photoconductor. Various NSS-photo-EMF detectors are described by M. P. Petrov et al. in "Non-steady-state photo-electromotive-force induced by dynamic gratings in partially compensated photoconductors", *Journal of Applied Physics*, Vol. 68, No. 5 (1990), pp. 2216–2225, and by S. I. Stepanov et al. in "Measuring vibration amplitudes in the picometer range using moving light gratings in photoconductive GaAs:Cr", *Optics Letters*, Vol. 15, No. 21 (1990), pp. 1239–1241.

With an NSS-photo-EMF detector, a space charge grating is formed in the photoconductor in response to alternating light and dark interference fringes which move in accordance with the velocity of the surface being examined. If the interference fringes move at a rate that is faster than the response time of the space charge grating, a net current flows through the photoconductor. An NSS-photo-EMF detector is sensitive to the frequency of the overall fringe pattern motion, rather than the exact shape of the fringe pattern as is the case with conventional detectors. When it is combined with a TDI, a system is produced that is relatively insensitive to the surface roughness of the target. Nevertheless, this approach requires lasers with long coherence lengths (on the order of meters) in order to coherently detect the desired high frequency modulated information produced by the vibrating surface. This means that a rather costly laser must be used, such as a single mode diode pumped solid state laser or a stabilized diode laser.

A dual time delay interferometer scheme that relaxes this long coherence length requirement is described by D. J. Erskine and N. C. Holmes in "White-light velocimetry," Nature, pp. 317–320, Sep. 28, 1995. It uses two TDIs and enables sensing of white light encoded information even over an aberrated path. The first interferometer imprints the illumination light with a coherent echo having a delay time given by the path length difference of its two arms. Light passing through the first interferometer and reflected from the target is observed by a second interferometer having its own characteristic delay time. As long as the speed of light times the difference in the delay times (i.e. the difference between the respective path length differences of the two interferometers) is less than the coherence length of the illumination light, partial fringes will be formed. This permits light sources with relatively short coherence lengths (e.g. white light) to be used as the illumination light. On the other hand, the dual-interferometer described by Erskine and Holmes is bulky (which severely limits its use, practicality and portability), since it must perfectly image and register the light reflected from the target onto a time delayed replica of itself, so that their wavefronts are spatially matched. Furthermore, this device requires that its optical components be interferometrically stable, and it cannot be used for phased array detection of objects.

The white light approach demands precision alignment and perfect imaging of the time-delay and through-beams in order to realize fringes; the precise alignment matches the two patterns, and the imaging maintains a near-field, phase-only field distribution, thereby avoiding speckle problems. It also demands interferometric stability and quadrature maintenance of the time-delay and through-beams to generate the desired fringe pattern, and requires that the incident beam be spatially coherent as it probes the workpiece; the precision imaging in the initial time-delay interferometer follows from this requirement.

The prior white light approach requires a 2-dimensional recording medium to evaluate and process the diagnostic output (such as a film plane or a video camera, in the case of real-time implementation), as well as precision image-preserving relay optical systems. These systems must possess high-resolution, flat-field, large field-of-view, distortion-free imaging capabilities to enable ultrasonic sensing. Moreover, in general the two imaging systems must be identical in terms of magnification and registration, and they must possess a large depth-of-focus when probing three-dimensional (i.e., non-planar) structures.

SUMMARY OF THE INVENTION

The present invention enables robust optical detection of phase modulated information (preferably in the range from about 10 kHz to 100 MHZ or more), even in the presence of optical path distortions. It can detect ultrasonic vibrations from highly diffuse surfaces, such as those of a workpiece that may have defects residing within in it, and in general can be used for remote sensing of phase-modulated information, such as that required for a communications link. Inexpensive optical sources (such as broadband laser diodes or white light), multimode optical fibers and simple TDIs can be used, leading to simple and compact laser-based ultrasonic sensors.

The invention combines three optical subsystems: (1) an optical beam source; (2) a pair of TDIs (or just one TDI when the invention is operated in a transceive mode), enabling broadband spectral sources to be employed for coherent detection purposes; and (3) an FPU that is preferably an NSS-photo-EMF adaptive photodetector, permitting coherent detection of spatially incoherent light that may have experienced static and/or dynamic optical path distortions.

The optical beam is passed through a TDI where it is modulated by imprinting it with a time delayed replica of itself (an "echo") corresponding to a first time delay, before it is directed towards a vibrating object. The beam is phase modulated by these vibrations upon reflection, and the reflected beam is imaged towards a second TDI (or back towards the first TDI in the transceive mode case) where it is modulated by imprinting it with a time delayed replica of itself corresponding to a second time delay, before it is directed towards the FPU. Interference fringes are formed on the face of the FPU which shift in accordance with the vibrations of the object being examined. The FPU detects the relative (global) lateral shift of the "speckled" fringes and sends this information to a processor that deduces information about the vibrations' amplitude and frequency. A constraint is that the difference in time delays must be within the coherence length of the optical source times the speed of light, but this condition is easily met using optical fiber-based interferometers. The NSS-photo-EMF detector automatically compensates for speckle noise and low frequency vibrations, and permits optical detection using broadband optical sources. Furthermore, it can accommodate poor quality optics, as well as multimode fibers that enable more efficient photon collection. Also, a phased-array of sensors can be used for enhanced imaging applications requiring better signal/noise ratios, or alternatively, when lower power optical sources are employed. Finally, as opposed to sensing motion of the object via reflection of a probe beam, the probe beam can be launched into an optical fiber (or fiber array) embedded in the material. Thus, as the material deforms or emits an acoustic emission "burst" (e.g., during life cycling, fatigue, etc.), the probe beam will be phase modulated by this perturbation. The beam exiting from the structure then enters the second TDI fiber line (or double-passes through the first), and is then incident onto the NSS-photo-EMF sensor for detection.

Further features and advantages of the invention will be apparent to those skilled in the art from the following detailed description, taken together with the accompanying drawings.

DESCRIPTION OF THE DRAWINGS

FIGS. 3a, 3b, 3c and 3d are schematic diagrams of different optical targets that can be monitored with the invention;

DETAILED DESCRIPTION OF THE INVENTION

As shown in the accompanying drawings, the present invention enables optical detection of phase-modulated information at ultrasonic frequencies, preferably between about 10 kHz and 100 MHZ. The invention includes an optical beam, an FPU that is preferably an NSS-photo-EMF detector, and one or two TDIs (just one is used when the invention is configured in the transceive mode). The beam is modulated by a first TDI that imprints it with a time delayed replica (an "echo") of itself and is then directed towards an object of interest that is vibrating. The object can be a workpiece that is vibrated by, say, a piezoelectric transducer or a laser, in which case the vibrations will yield information on the location and size of any defects residing within the workpiece. Alternatively, the object may be a reflector that is being vibrated such that its vibrations contain information to be detected, i.e. the object can be used for optical communications. The "object" can also be in the form of an optical fiber embedded in a material, with the light exiting the fiber or reflecting from its rear face (or a grating placed along its length), with the perturbed fiber encoding a phase modification onto the probe beam. Upon reflection from the object, the beam is phase modulated by its vibrations. This reflected beam is directed towards a second TDI (or alternatively, back towards the first TDI in the case when just one TDI is used) where it is modulated by imprinting it with a time delayed replica of itself before reaching the FPU, which is preferably an NSS-photo-EMF detector. Interference fringes that form on the face of the FPU shift in accordance with the vibrations of the object being examined. This relative shift in the fringe pattern is detected by the FPU, which sends its output to a processor that deduces information from the vibrations.

Figure 1:
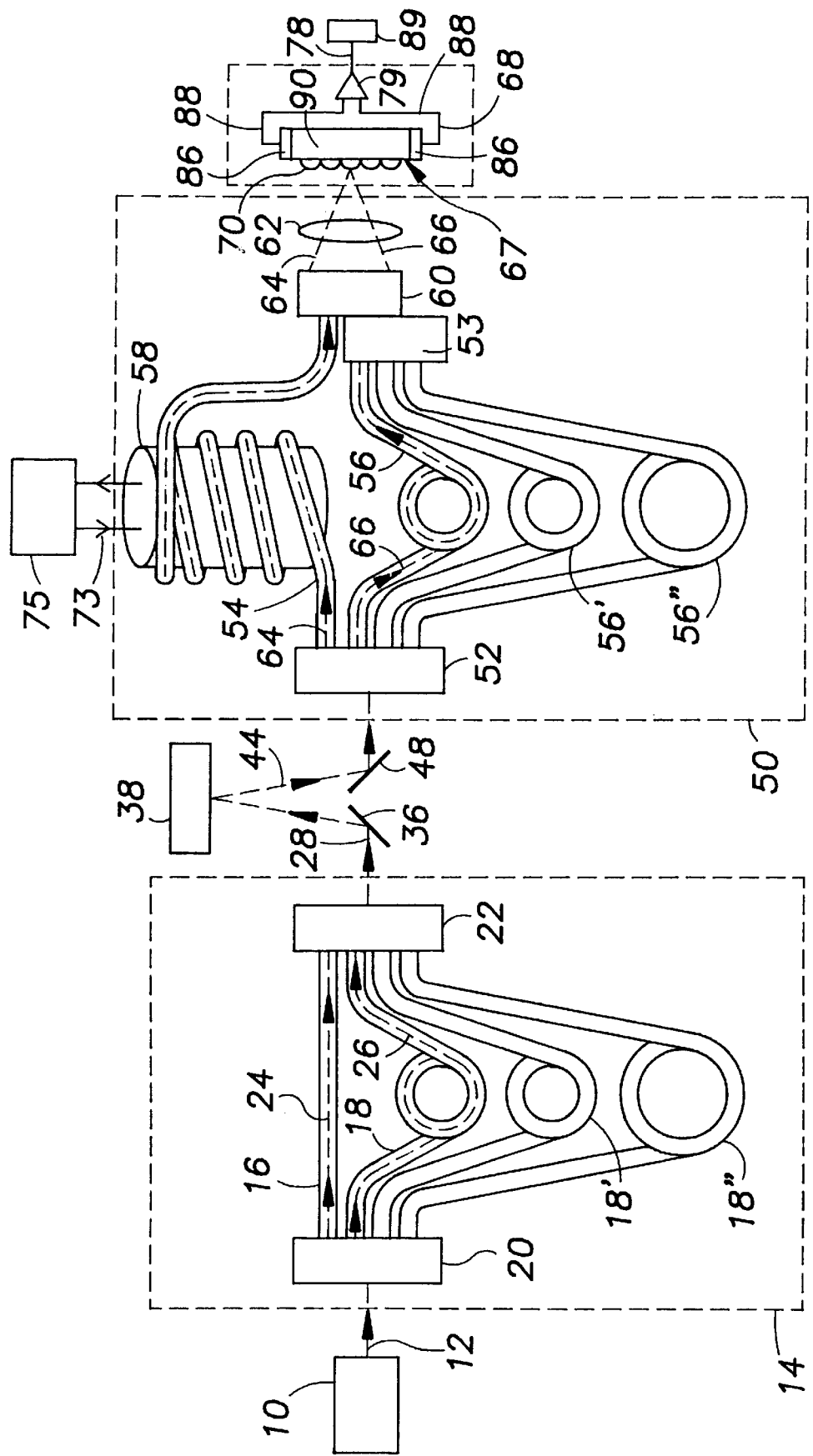
FIG. 1 is a schematic diagram of one embodiment of the invention which uses two TDIs for optical detection of phase modulated information.

One embodiment of the invention is illustrated in FIG. 1. An optical source 10 generates an optical probe beam 12 that enters a first TDI 14. Optical source 10 can be one of a number of sources of electromagnetic radiation, such as a multimode diode laser, superluminescent laser, or a broadband source such as a spectral discharge lamp, depending upon what coherence length is desired, as explained below. In general, however, long coherence length lasers are not required (for any of the embodiments), and lasers or broadband sources with coherence lengths in the range of microns to millimeters may also be used. Although the first TDI 14 can be constructed from optical components that are physically separated from each other such as mirrors, it preferably comprises shorter and longer optical fibers 16 and 18 that are joined together at their opposite ends by fiber optic couplers 20 and 22. Fiber optic coupler 20 splits the optical probe beam 12 into two fractions of preferably equal intensity, beams 24 and 26, which pass through optical fibers 16 and 18, respectively, whereas fiber optic coupler 22 recombines these two beams into a modulated optical probe beam 28. This process can be thought of as imprinting an echo onto the optical probe beam 12. Beam 26 is thus a time delayed replica of beam 24 characterized by a delay time $\tau_1$, and optical fibers 16 and 18 form the two arms of the TDI 14, in which the difference between their respective path lengths determines $\tau_1$. Fiber optic couplers 20 and 22 can alternatively be mounted to additional optical fibers 18' and 18" having lengths different from optical fiber 18, so that different lengths of optical fiber can be selected at any one time. In this case, fiber optic coupler 20 preferably functions as a programmable switch, so that optical fibers 18, 18', or 18" can be selected as desired. The reasons for designing the TDI 14 in this way are explained below.

Figure 2A:
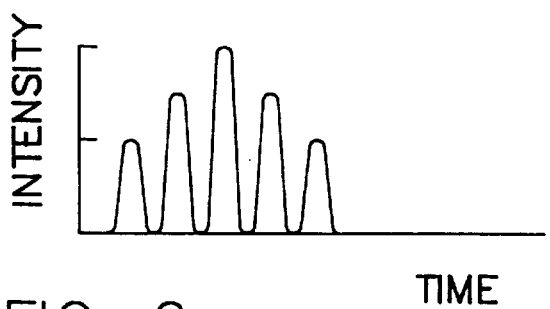
FIGS. 2a–2d are plots illustrating the progression of optical wavepackets through the invention at successive times.
Figure 2B:
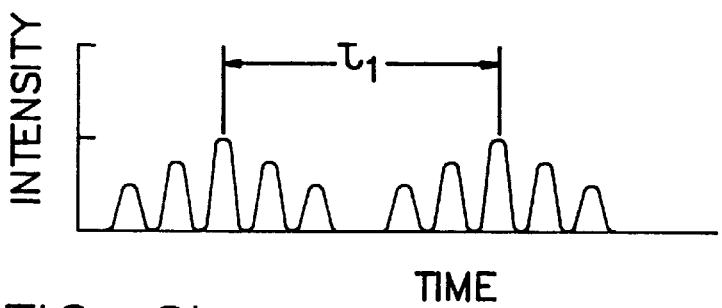

FIGS. 2a and 2b illustrate the relationship between the optical probe beam 12, the modulated optical probe beam 28 and the delay time $\tau_1$. Optical probe beam 12 can be thought of as a series of independent wave packets, one of which is shown in FIG. 2a. Modulated optical probe beam 28, on the other hand, is represented in FIG. 2b as two wave packets that correspond to the two arms of the first TDI 14, in which the wave packet that lags behind in time has passed through optical fiber 18. These two wave packets are separated in time by $\tau_1$, and have the same shape as the wave packet of FIG. 2a but only half its intensity (since energy is conserved).

The modulated optical probe beam 28 is directed by a beam director, preferably a mirror 36, onto a vibrating object 38 whose vibrations are to be determined, or alternatively, the first TDI 14 may directly transmit the modulated probe beam onto the vibrating object. Contrary to the prior art, precision imaging is not required. The modulated probe beam 28 is phase modulated by the vibrating surface of object 38 which it hits, and is reflected from object 38 as a reflected beam 44.

The reflected beam 44 is directed, either without deflection or via a beam deflector such as a mirror 48, into a second TDI 50. The second TDI 50 preferably includes multi-mode fiber optic couplers 52 and 53 at opposite ends of shorter and longer optical fibers 54 and 56, a transducer 58 that is preferably a PZT, a spectral filter 60 at the output of coupler 53, and a focusing lens 62 to focus the output from filter 60. Fiber optic coupler 52 receives the reflected beam 44 and divides it into two fractions of preferably equal intensity, beams 64 and 66, which pass through the shorter and longer optical fibers 54 and 56, respectively. As in TDI 14, additional optical fibers 56' and 56" having lengths different from that of optical fiber 56 can be added between couplers 52 and 53, permitting the user to select among optical fibers 56, 56', and 56" as desired. For this purpose, fiber optic coupler 52 preferably functions as a programmable switch, so that different optical fibers can be selected at different times.

The fibers within TDI 50 need not be identical to those within TDI 14 in terms of the number of modes, although the fibers 16, 18, 18' and 18" within TDI 14 should each have the same number of modes, as should the fibers 54, 56, 56' and 56" within TDI 50.

Beams 64 and 66 are imaged onto a face 67 of an FPU 68, preferably through the spectral filter 60 and the focusing lens 62. Alternatively, the spectral filter 60 can be placed in front of the optical source 10 or at any other convenient location in the optical train. The filter can also be in the form of a grating embedded in the fiber(s).

Figure 2C:
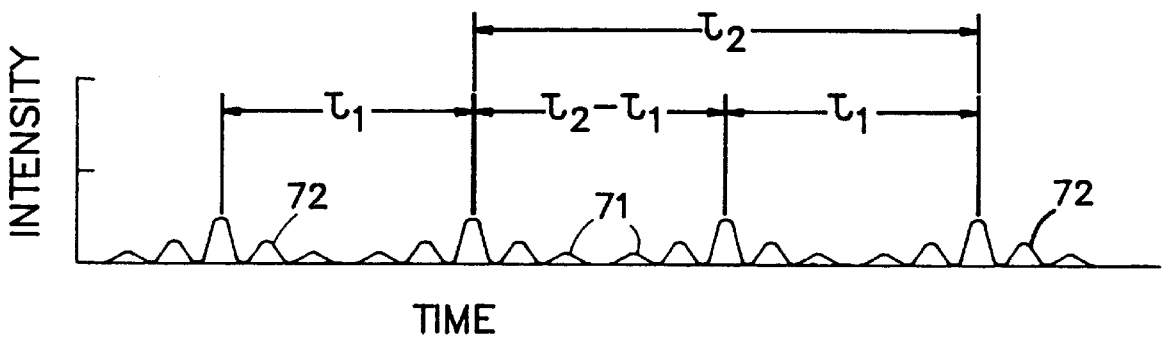
Figure 2D:
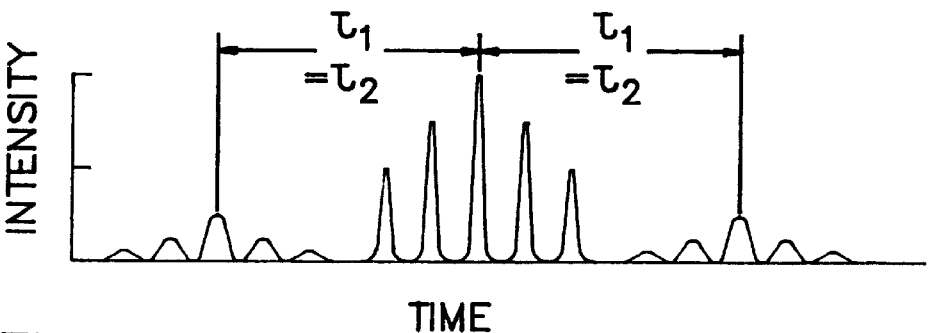

Beams 64 and 66 produce a pattern of interference fringes 70 at the FPU face 67 from which information about the vibrations of object 38 can be determined. The formation of fringes 70 will now be explained. In a manner analogous to the first TDI 14, beam 66 is a time delayed replica of beam 64 and is characterized by a delay time $\tau_2$ relative to beam 64. Optical fibers 54 and 56 plus the additional distances that beams 64 and 66 travel from the fibers to the FPU face 67 form the arms of the TDI 50, in which $\tau_2$ is determined by the difference in the path lengths of the two arms. When $\tau_2$ and $\tau_1$ are badly mismatched, the second TDI 50 will not produce constructive and destructive interference of the wavepackets shown in FIG. 2b. No attempt has been made to illustrate in the figures the phase modulation of these wavepackets arising from vibrations of the object 38, but this does not change the underlying principles. FIG. 2c shows four wave packets and represents beams 64 and 66 as they arrive in turn at the FPU face 67 in the absence of constructive and destructive interference; the relative intensity of each wave packet is less than those of FIG. 2b by a factor of two, since energy is conserved. As $\tau_1$ approaches $\tau_2$, however, the two center wavepackets 71 shown in FIG. 2c will begin to overlap with each other, leading to regions of constructive and destructive interference. When $\tau_2=\tau_1$, beams 64 and 66 will interfere strongly, leading to the situation indicated in FIG. 2d in which the first and last wavepackets 72 of FIG. 2c do not interfere with other wavepackets, but wavepackets 71 of FIG. 2c (corresponding to the last wavepacket of beam 64 and the first wavepacket of beam 66) do interact strongly with each other to form fringes 70 on the FPU face 67.

The wavepackets will be non-interfering when the difference between $\tau_1$ and $\tau_2$ times the speed of light is greater than the coherence length of the light incident on the FPU face 67. This requirement is relatively easy to satisfy and permits short coherence length radiation to be used, such as multimode laser diodes and broadband light sources. If need be, however, the effective coherence length of optical source 10 can be increased by using a spectral filter such as filter 60, which selects a portion of its spectrum. Also, the delay time $\tau_2$ can be varied to better match $\tau_1$ by using the transducer 58, which is preferably a piezoelectric transducer (PZT) about which one of the optical fibers, e.g., optical fiber 54 is wound. As signals 73 from a voltage source 75 are applied to the transducer 58, it expands or contracts to deform the optical fiber 54, and in so doing varies the optical path length of the fiber. It may also alter the speckle pattern emerging from fiber 54, but the FPU can track and thus compensate for these low frequency effects (typically less than 10 kHz).

The time delays $\tau_1$ and $\tau_2$ can also be varied by selecting different optical fibers with fiber optic couplers 20 and 52. Optical fibers 18 and 56, 18' and 56', and 18" and 56" are preferably designed to function together simultaneously as pairs and have lengths that are chosen accordingly. One reason for varying the time delays is that they effectively control the low frequency cutoff of the invention. For example, if the time delays are too short, then low vibrational frequencies will not be cleanly resolved between the arms of the interferometer, but this may be an advantage if such frequencies represent background noise that can be neglected. Varying the time delays has another application related to communications applications, however. By periodically and randomly varying the set of fixed time delays in the TDIs 14 and 50, the task of intercepting and decoding information is made much more difficult. Thus, the security of such a communications link can be enhanced by programming the TDIs to have optical delay times that change together in a coordinated way so that their difference remains constant. One can view this form of encryption as coherence-time modulation of the light.

In general, the optical fibers 18 and 56 (or 18' and 56', etc.) do not need to be identical in terms of the number of spatial modes. The choice of the TDI components will depend upon the number of spatial modes in each part of the system. For example, the first TDI 14 need only match or exceed the number of spatial modes of the optical probe beam 12 for maximum efficiency (subject to any other constraints such as nonlinear power-handling limitations), and might include a single mode fiber. The second TDI 50, on the other hand, must at least match the number of spatial modes scattered by of the vibrating object 38 while accommodating any propagation path distortions. In general, if the object 38 has a highly diffuse surface, this surface will dictate the number of modes required for the efficient collection of the scattered light, and the second TDI 50 will preferably include a multimode fiber.

The FPU 68 detects motion of the interference fringes 70 and generates an output signal 78 when the frequency of the fringe motion exceeds a threshold value that is characteristic of the FPU 68. It preferably includes an amplifier 79 that converts current into voltage to generate the signal 78. The amplifier 79 is connected to electrodes 86 of the FPU 68 by signal lines 88. A processor 89 receives signal 78 and is programmed to extract information about the vibrations of the object 38 from the magnitude of the current flow across the FPU 68. Depending upon the application, this information may correspond to the presence and size of internal features within the object 38 or to coded communications information.

The FPU 68 is preferably an NSS-photo-EMF detector. Its face 67 includes a photorefractive-like photoconductive material 90 that is preferably a 1 mm thick sample of semi-insulating GaAs:Cr, although other photoconductors, such as $Bi_{12}SiO_{20}$, CdTe:V or InP:Fe may also be used. However, the material need not necessarily possess an electro-optic coefficient as is required in conventional photorefractive media. The spectral filter 60 and the wavelength of the optical source 10 are preferably chosen to maximize the sensitivity of the photoconductive material 90. When GaAs:Cr is used, optical source 10 is preferably a GaAs laser that emits light near 900 nm.

The electrodes 86 of detector 68 are preferably ohmic, so that they add little resistance to the current flow path. The electrodes 86 can be disposed perpendicular to the FPU face 67; surface electrode strips, which are much easier to process, may be used instead if cost is important. Alternatively, the ohmic contacts can be diffused from the face 67 to the back side of the detector 68. Due to the high resistivity of the photoconductive material 90, silver paint can also be used as simple, low-cost electrodes 86.

The optical interference fringes 70 are formed on the FPU face 67. Photo-induced carriers (not shown) are created in illuminated regions of the photoconductor that correspond to constructive interference. These carriers diffuse towards dark regions of the photoconductor that correspond to destructive interference, causing a charge separation which results in the creation of a space-charge "grating" in the photoconductive material 90. This grating has a periodicity that is the same as the interference fringes 70.

While the grating is being initially formed, the carrier diffusion causes net current flow from regions of constructive interference to regions of destructive interference. However, once the charge separation reaches equilibrium (i.e. the space-charge grating is fully formed), these internal currents across the photoconductive material 90 go to zero. At this point, if the fringes 70 move (due to vibrations of the object 38), current may flow across the photoconductive material 90 depending upon the temporal frequency components of the fringe motion. If the frequency components are low enough that the space-charge grating can track the interference fringes 70, then no net current will flow across the photoconductive material 90. At a certain threshold frequency, however, the space charge grating cannot track the interference fringes 70, and current is produced as newly photoionized carriers respond to the electric field of the existing space-charge grating.

The threshold fringe motion frequency (and therefore the threshold vibration frequency of object 38) is determined by the intrinsic response time of the photoconductive material 90 and the intensity of light on it. With GaAs:Cr, net current flow will be produced for frequencies greater than 10 kHz. Above this threshold, the current flow will be constant with frequency until the upper limit bandpass edge, which is determined by the recombination time of the photoconductive material 90 and may be 100 MHZ or greater, is reached. Thus, the detector 68 senses small changes in the overall fringe pattern corresponding to fluctuations in the position of the vibrating object 38 that are preferably between about 0.1 and 0.0001 times the wavelength of the optical probe beam 12. Given the time-delay aspect of the second TDI 50, the detector 68 will sense a bipolar output so long as the delay time is comparable to, or greater than, the (phase-modulated) pulse width of the vibrations.

The combination of the first and second TDIs 14 and 50 with the NSS-photo-EMF detector 68 results in a system that suppresses the detection of low frequencies. For example, low frequency vibrations of the object 38 will result in low frequency motion of the interference fringes 70, which will not be detected by the NSS-photo-EMF detector 68 as long as the fringe motion frequency is lower than the response time of the photoconductive material 90. Thus, active stabilization of the TDIs 14 and 50 is not required, since they do not have to be held in quadrature. Furthermore, any slow drifts in the interference fringes 70 caused by instability in TDIs 14 and 50 will not degrade the performance of the detector 68. Also, if the noise has a time scale greater than the delay time in TDI 50, then the fringe motion will be essentially zero, owing to the "common mode rejection" nature of the interferometer formed by beams 64 and 66. Since long-term effects are typically due to undesirable noise stemming from noise sources such as thermal drifts or whole-body mechanical vibrations, the system is auto-compensating.

The present detection system may be used with optically rough readout surfaces and broadband optical sources, since it is generally insensitive to laser speckle. The insensitivity of the system to dynamic laser speckle and background vibrations make it particularly well suited for assembly line inspection systems, in which workpieces are inspected while they are moving at relatively high velocities.

Object 38 may be a workpiece whose vibrations yield information on possible defects within the object; FIGS. 3a, 3b, 3c and 3d illustrate other possible applications. In FIG. 3a, the modulated optical probe beam 28 is directed into an optical fiber 91 that is embedded in a test material 92, which may be an airplane wing, for example. This is called a "distributed" sensor, in that any vibrations along fiber 91 will modulate the phase of beam 28. This contrasts with the prior art, which requires imaging of a plane into the second TDI, as opposed to a distributed sensor. This configuration represents a so-called "smart material," in which vibrations within material 92 produce small variations in the path length of the optical fiber 91, thereby altering the phase of the modulated optical probe beam 28 before it is reflected off a far end 93 of the optical fiber 91. The end 93 is preferably coated but may be impregnated with a grating that acts like a mirror. Alternatively, the output end 93 of fiber 91 can be directed to form beam 44.

In FIGS. 3b and 3c, applications for communications systems are illustrated. In FIG. 3b, a reflective screen 94 that may be retroreflective contacts a transparent electo-optic cell 95 and vibrates in response to signals 96 that are applied to the cell 95 by a voltage source 98. The vibrations phase modulate the modulated optical probe beam 28. Signals 96 can represent encoded information to be detected by the invention. FIG. 3c shows an alternative reflector, which includes a transducer 99 about which an optical fiber 100 is wound. The incident probe beam 28 is preferably focused by a lens 101 into one end of the optical fiber 100 and is reflected off the opposite end 102 of the fiber, which may be coated or include a grating that acts like a mirror. Signals 96' from a voltage source 98' are applied to the transducer 99, which expands or contracts in response to these signals. Optical fiber 100 expands and contracts with the transducer 99 so that the optical path length of the fiber varies to phase modulate beam 28. In each of the applications shown in FIGS. 3a, b and c, the reflected beam 44 carries information in its phase modulation that is related to an object's vibrations.

As illustrated in FIG. 3d, the remote modulator can also be in the form of a retro-reflector array 103 to redirect the probe beam 28 in a reverse direction back to a time-delay fiber transceiver 104, an example of which is described in connection with FIG. 4. The array 103 can be imperfect, such as an inexpensive screen similar to a lenticular projector or movie screen, or an inexpensive embossed cornercube array such as those used by fire-fighters or mounted on clothes or bicycles, with a phase modulator 106 in front of the screen to encode a remote message from a remote signal source 108 onto the probe beam 28.

Figure 4:
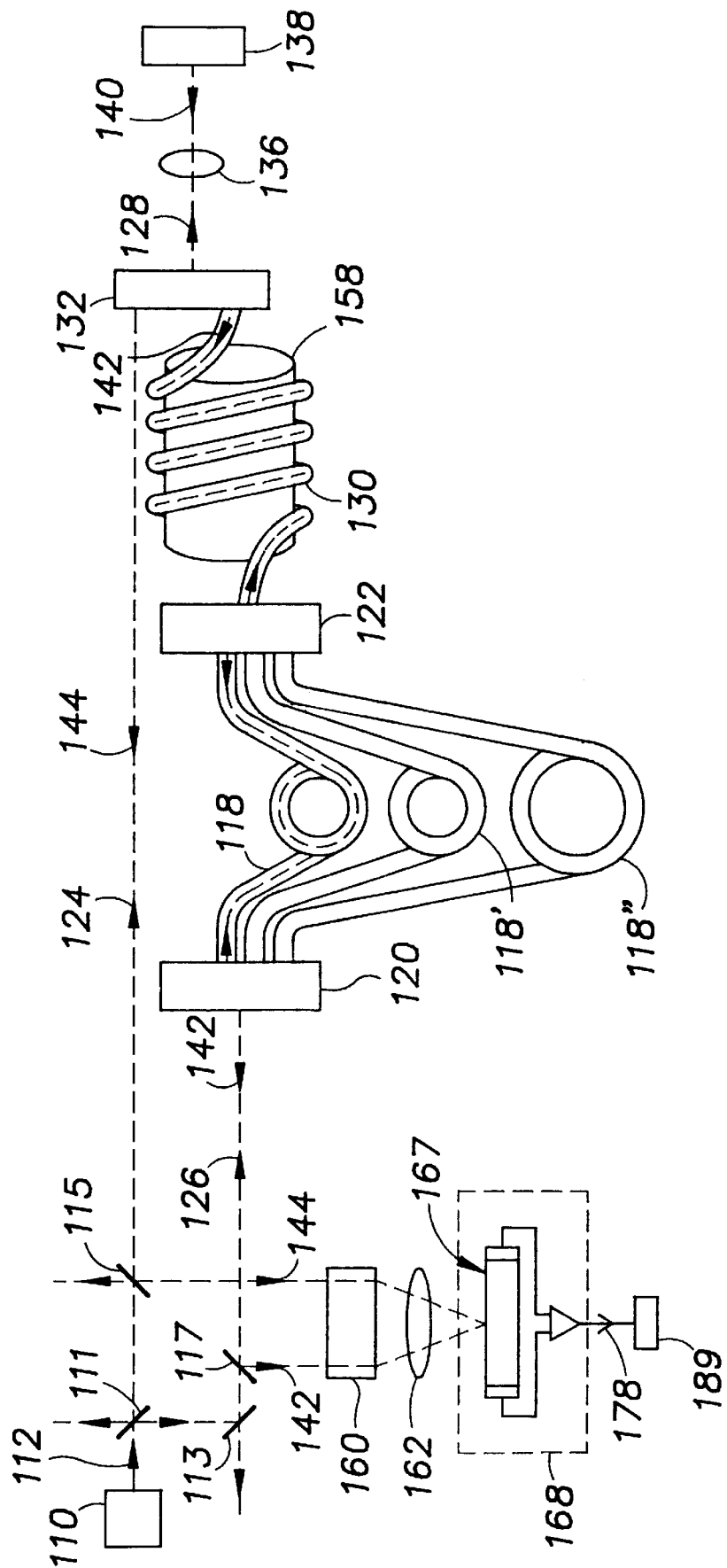
FIG. 4 is a schematic diagram that illustrates another embodiment in which a single TDI is used in a transceive mode.

Another embodiment of the invention is shown in FIG. 4, in which a single TDI performs the functions of two TDIs, i.e. this invention operates in the transceive mode. It is otherwise similar to the embodiment of FIG. 1 and includes corresponding components. This compact configuration is particularly well suited for communications applications. An optical source 110 generates an optical probe beam 112 that is split by a beam splitter 111 into two fractions having preferably equal intensities, beams 124 and 126. Beam 126 is redirected by a beam director such as mirror 113, and beams 124 and 126 are partially transmitted through two additional beam splitters 115 and 117, respectively, that are also used in directing returning light, as explained below. Light that is reflected from the beam splitters at this point leaves the system and does not contribute to its operation.

Beam 126 enters a preferably programmable fiber optic coupler 120 and then one of a plurality of optical fibers 118, 118', or 118" having different lengths, depending upon how fiber optic coupler 120 is programmed. The opposite ends of optical fibers 118, 118' and 118" enter another fiber optic coupler 122 so that beam 126 passes through coupler 122 and into another optical fiber 130 wound around a transducer 158 that is preferably a PZT. Optical fiber 130 is linked to another fiber optic coupler 132 that receives both beams 124 and its time delayed replica 126, and combines them into a beam 128.

Beam 128 is preferably directed through a lens 136 and then onto a vibrating object 138 (or vibrating corner cube or retro reflector array), whose vibrational frequencies are to be determined. Object 138 can be a workpiece or reflective or retroreflective versions of the embodiments shown in FIGS. 3a, 3b, 3c and 3d. Its vibrations phase modulate beam 128, which reflects off object 138 to yield a reflected beam 140 that follows the same path as unmodulated beam 128, but in the opposite direction. Beam 140 is divided by fiber optic coupler 132 into two fractions, beams 142 and 144, which propagate back along the same optical paths as beams 126 and 124, respectively, to beam splitters 117 and 115, respectively (some of beams 142 and 144 can be derived from both beams 124 and 126). Beam splitters 115 and 117 redirect portions of beam 144 and its time delayed replica 142, respectively, through a spectral filter 160 that is followed by a lens 162; the remainder of beams 144 and 142 exit the system. Spectral filter 160, lenses 136 and 162, and beam splitters 111, 115, and 117 can be free standing optical components, or optical fiber and guided-wave analogs.

The portions of beams 142 and 144 remaining in the optical system are directed onto a face 167 of a FPU 168 where they constructively and destructively interfere to form a pattern of interference fringes, provided that the optical components are aligned so that the time delays for the outgoing and incoming beams differ by no more than the coherence time of the light at FPU face 167 (i.e. the coherence length divided by the speed of light). The FPU 168 generates an output signal 178 that is fed into a processor 189. FPU 168 and the processor 189 function like their counterparts 68 and 89 of FIG. 1. The embodiment of FIG. 1 which comprises two TDIs can likewise omit the optical fibers 16 and 54, and instead transmit beams 24 and 64 directly to fiber optic coupler 22 and spectral filter 60, respectively. In this case, PZT transducers like transducer 58 are preferably included, about which optical fibers 56, 56', and 56" are wound.

The communications link is relatively secure for several reasons:

1) The optical source can have a very short coherence length, and can approach a "white light" source.

2) The signal is encoded via a phase-modulated "burst", which makes it difficult to intercept and decode.

3) The optical source coherence length is randomly modulated, which further secures the link since, unless one possess the "coherence-length modulation key", one will not be able to decrypt the information.

Figure 5:
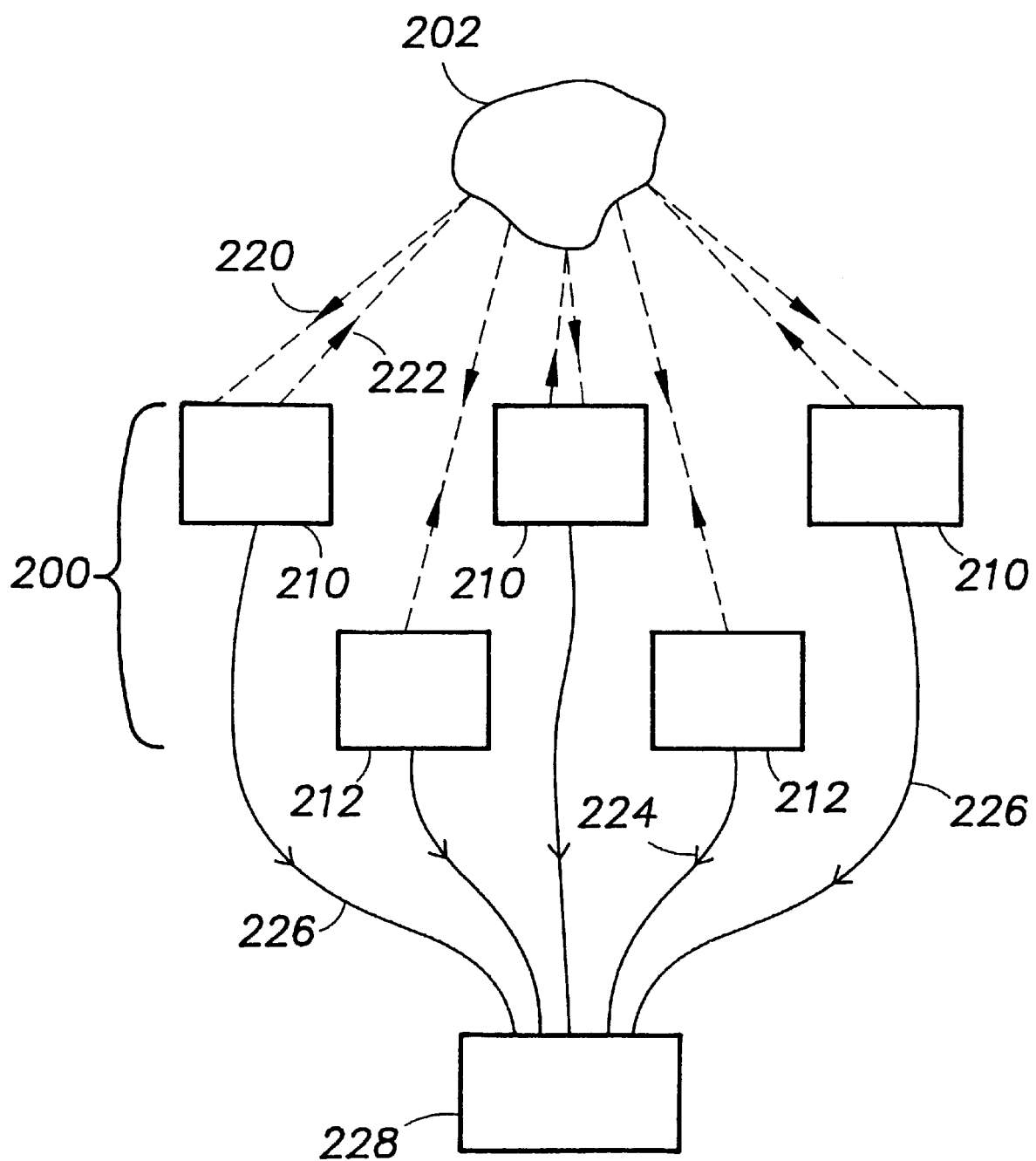
FIG. 5 is a block diagram illustrating a phased-array implementation of the invention.

As indicated in FIG. 5, an array 200 of the new ultrasonic sensor systems can be positioned to monitor vibrations at different faces or points of an object 202 simultaneously. For this purpose, ultrasonic sensors like those of either FIG. 1 (210) or FIG. 4 (212) can be used, or both can be used together, as shown in FIG. 5. As in the other embodiments, beams 222 from the ultrasonic sensors 210 and 212 are directed onto the object 202, where they are phase modulated by its vibrations and reflected back as reflected beams 220 that reenter the ultrasonic sensors and form interference fringes on the faces of their respective FPUs. Output signals 224 from the FPUs are directed through signal lines 226 to a processor 228 that extracts information about the vibrations of the object 202 based upon the magnitude of the current flow across the respective FPUs. By accounting for the lengths of the various signal lines 226 and the distance of the ultrasonic sensors 210 and 212 from the object 202, the array 200 can function as a phased array, thereby yielding more detailed information about the nature of any defects that may reside within the object. A phased array 200 can reduce system costs, since a lower power laser can be used to initiate vibrations on the object 202 (less surface displacement is required when the phase sensitivity is improved) as well as for the optical probe beams, since a phased array architecture enables more efficient use of the available photons and rejects randomly phased acoustic noise.

The present invention obviates the need for critical alignment required by the prior white light approach, since the space-charge field will form based upon the complex speckled and phase distorted fields. Moreover, the invention enables fiber delay lines, since the multi-mode fibers themselves impose complex speckled fields which cannot be compensated using mere imaging optics.

The invention also automatically compensates for interferometric instabilities, as well as automatically guaranteeing the quadrature condition (via the space-charge field phase shift). It obviates the need for spatial coherence and precision imaging in the first interferometer, since its photo-emf detector treats incident spatial incoherence in the same manner as the roughened surface of the workpiece and as the second time-delay interferometer.

The invention furthermore relaxes the need to "match" the pair of interferometers. Therefore, a different fiber delay line can be used in each of the two time-delay lines. As an example, a single-mode fiber can be used in the first leg, and a multi-mode fiber in the second leg. Alternatively, a small number of modes can be used in the first leg (to enable a high-peak-power laser probe to propagate through the fiber without optical damage or nonlinearities), while the second leg must be far greater than the number of modes in the first leg). Thus, the system can be optimized so that a very small interrogation spot can be realized in probing a small region of the workpiece (by using the minimum number of modes in the first interferometer, subject to optical power-handling), while in the second interferometer a large number of guided modes enable collection of the most light possible (to realize the greatest signal-to-noise ratio or sensor sensitivity).

Fiber mandrels can be added on each leg to dither servo-control any thermal and/or mechanical drifts, thereby enabling the use of the shortest coherence-length laser or other optical source possible, and thus reducing the overall cost of the system. This feedback control need not have such high gain as to enable interferometric control as in the prior art; all that is required is that the path-length-difference be less than the coherence length of the optical source (which is typically many optical wavelengths, as opposed to a fraction of an optical wavelength that is typically required for precision quadrature control of a coherent homodyne detector).

The invention overcomes the expensive and process-intensive 2-dimensional detection system of the prior white light approach by replacing it with a FPU (e.g., a NSS-photo-EMF detector). It also replaces the bulky, expensive set of optical components by a pair of compact, low-cost (even plastic) optical fiber delay lines, with low-cost optical coupling elements. Since the NSS-photo-EMF detector compensates for the fiber-induced speckle as well as for imperfect optical components, the system will function even when using low-cost, imperfect optical elements, as well as in the presence of misalignments. Finally, the invention enables one to realize, in essence, extremely long effective depths-of-focus, since speckle or imperfect optical fringes are automatically compensated by the NSS-photo-EMF detector.

Given that the prior art requires precision spatial registration, as well as perfect re-imaging of each individual image-relay module separately, as well as perfect mapping of the image-relay networks collectively, the use of fibers to serve as the time-delay lines is counter-intuitive, owing to the inability of a multi-mode fiber to maintain a perfect image along its length, and the need to match the image from one time-delay line to the other.

While particular embodiments of the invention have been shown and described, numerous variations and alternate embodiments will occur to those skilled in the art. Accordingly, it is intended that the invention be limited only in terms of the appended claims.

We claim:

1. An ultrasonic vibration detection system, comprising:
an optical source for generating an optical probe beam;
an optical system that receives and modulates said optical probe beam by combining a fraction of said optical probe beam with a time delayed replica of itself characterized by a first delay time, wherein said modulated optical probe beam is directed onto a vibrating object for phase modulation by and reflection from said object, said optical system receiving and modulating said reflected beam by combining a fraction of said reflected beam with a time delayed replica of itself characterized by a second delay time, said first and second delay times chosen to produce constructive and destructive interference within said modulated reflected beam; and
a fringe processing unit positioned to receive said modulated reflected beam, so that constructive and destructive interference within said modulated reflected beam produces an interference fringe pattern on said fringe processing unit, said fringe processing unit responding to fringe pattern motion resulting from said object's vibrations rather than from the absolute position of said fringes to generate an output signal which contains information about said vibrations, and
further comprising a fiber with a reflective end that is embedded in said object, wherein said modulated optical probe beam is directed into the opposite end of said fiber for phase modulation by said object's vibrations through resulting path length changes of said embedded fiber.

2. The ultrasonic vibration detection system of claim 1, wherein said fringe processing unit comprises a non-steady state photo-electromotive-force (NSS-photo-EMF) detector.

3. The ultrasonic vibration detection system of claim 2, wherein the coherence length of said optical source is in the range of microns to millimeters.

4. The ultrasonic vibration detection system of claim 2, wherein said optical source produces broadband electromagnetic radiation.

5. The ultrasonic vibration detection system of claim 4, further comprising a spectral filter for increasing the coherence length of the broadband electromagnetic radiation.

6. An ultrasonic vibration detection system, comprising:
   an optical source for generating an optical probe beam;
   an optical system that receives and modulates said optical probe beam by combining a fraction of said optical probe beam with a time delayed replica of itself characterized by a first delay time, wherein said modulated optical probe beam is directed onto a vibrating object for phase modulation by and reflection from said object, said optical system receiving and modulating said reflected beam by combining a fraction of said reflected beam with a time delayed replica of itself characterized by a second delay time, said first and second delay times chosen to produce constructive and destructive interference within said modulated reflected beam; and
   a fringe processing unit positioned to receive said modulated reflected beam, so that constructive and destructive interference within said modulated reflected beam produces an interference fringe pattern on said fringe processing unit, said fringe processing unit responding to fringe pattern motion resulting from said object's vibrations rather than from the absolute position of said fringes to generate an output signal which contains information about said vibrations, and
   further comprising:
   an optical fiber having a reflective end; and
   a transducer that contacts said fiber and changes size in response to applied signals, wherein said modulated optical probe beam is directed into the opposite end of said optical fiber, said optical fiber's optical path length varying as said transducer changes size so that said modulated optical probe beam is phase modulated.

7. The detection system of claim 6, wherein said optical source randomly modulates the coherence length of said probe beam to encrypt the probe beam.

8. The ultrasonic vibration detection system of claim 6, wherein said fringe processing unit comprises a non-steady state photo-electromotive-force (NSS-photo-EMF) detector.

9. The ultrasonic vibration detection system of claim 6, wherein the coherence length of said optical source is in the range of microns to millimeters.

10. The ultrasonic vibration detection system of claim 6, wherein said optical source produces broadband electromagnetic radiation.

11. The ultrasonic vibration detection system of claim 10, further comprising a spectral filter for increasing the coherence length of the broadband electromagnetic radiation.

* * * * *